3,328,456
TRANS-3,4-DIHYDRO-2-CYANO-3-HYDROXY-METHYL-4-HYDROXYANILINE
Francis Johnson, Newton Lower Falls, Mass., assignor to The Dow Chemical Company, Midland, Mich., a corporation of Delaware
No Drawing. Filed Apr. 9, 1964, Ser. No. 358,605
13 Claims. (Cl. 260—464)

This invention relates to a novel polyfunctional cyclohexadiene and to methods of preparing said compound.

It is a fundamental object of this invention to provide a highly reactive polyfunctional cyclohexadiene. It is another object of this invention to provide processes for synthesizing a substituted cyclohexadiene compound. Other objects and advantages of the invention will in part be obvious and in part appear hereinafter.

The invention, accordingly, is directed to trans-3,4-dihydro-2-cyano-3-hydroxymethyl-4-hydroxyaniline $(C_8H_{10}N_2O_2)$ a novel compound having a molecular weight of 166, and a melting point of 157° C. Its ultraviolet absorption spectrum exhibited a maximum at 3300 A. (H=5,700). This compound is prepared by the reaction of cyanide ion with epichlorohydrin, or by the reaction of sodium methoxide with 3-hydroxy-4-halobutyronitrile.

The process utilizing epichlorohydrin requires two moles of epichlorohydrin and two moles of cyanide ion for the preparation of one mole of the desired product. Less than two equivalents of cyanide reduce the yields considerably. The cyanide ion reacts under highly alkaline conditions, i.e. pH between about 11 and 13 to form the desired product. An unbuffered solution having a pH between 11.5 and 12.5 is preferred. It is supplied to the reaction in the form of an aqueous solution of an alkaline cyanide compound, e.g. sodium cyanide, potassium cyanide, lithium cyanide, etc. Epichlorohydrin, or such equivalent compounds as 1,3-dichloropropanol-2 (which is known to form epichlorohydrin by reaction with sodium ion), may be utilized.

The reaction of the cyanide ion and the epichlorohydrin is highly exothermic. It is preferable to add cyanide solution dropwise to the epichlorohydrin. The preparation must be carried out between 50° C. and −50° C. It is preferable to hold the temperature between about −10° C. and 30° C. during the addition of the cyanide to the epichlorohydrin. The trans-3,4-dihydro-2-cyano-3-hydroxymethyl-4-hydroxyaniline is a major product of the reaction. It is water soluble. It is recovered from the reaction mixture by extraction procedures. Prolonged continuous extraction with ethyl acetate is the preferred extraction procedure. Minor amounts, 10% or less of 4-chloro-3-hydroxybutyronitrile, 4-hydroxycrotonitrile, and 2,5-bis(cyanomethyl)-1,4-dioxane, are obtained as by-products of the reaction. It is not necessary to use an inert atmosphere over the bath during the preparation.

The preparation of the desired cyclohexadiene utilizing the butyronitrile reactant is carried out in a solvent such as benzene, ether, dioxane, etc., 3-hydroxy-4-chlorobutyronitrile and the sodium methoxide are reacted in the solvent at temperatures between −50° C. and 50° C. and preferably between 0° C. and 20° C. The equivalent 4-bromobutyronitrile may be used as the reactant. Equivalents of sodium methoxide are the lower alkoxides of sodium, potassium, and lithium, such as potassium methoxide, lithium ethoxide and sodium butoxide. The methoxide is in a hydroxylic solvent, preferably an alcohol such as methanol ethanol, propanol, etc.

The details of the process will be better understood by reference to the following illustrative examples in which all temperatures are ° C.

*Example I*

To a two-liter flask containing a magnetically stirred solution of sodium cyanide (100 g.; 2.04 moles) in water (480 ml.) there was added dropwise, epichlorohydrin (192 g.; 2.04 moles), during a period of one and a half hours. While this addition was being made, the temperature of the contents of the flask was kept at 0–5° C. using an acetone Dry-Ice bath. Very strong cooling was required to maintain this temperature and without it a highly exothermic and almost explosive reaction took place. Upon complete addition of the sodium cyanide solution the temperature was held between 10–20° for 5 hours with stirring, and thereafter at room temperature overnight. Filtration of the dark-red reaction mixture removed a small amount (4.5 g.) of a colorless crystalline solid, M.P. 165–167°, which was identified as 2,5-bis(cyanomethyl)-1,4-dioxane. The aqueous filtrate then was continuously extracted with ethyl acetate for 75 hours. At the end of this time the extract was decanted from a considerable amount of crystalline material. Removal of the ethyl acetate under reduced pressure furnished a sludge of oil and crystalline matter. The latter was diluted with hot ethanol and after cooling the crystals were removed by filtration. These were combined with the crop which had separated out during the extraction procedure, and recrystallized from ethanol to afford lemon-yellow crystals (31 g.), M.P. 154–156°. A sample recrystallized 3 times from acetone furnished pure trans-3,4-dihydro-2-cyano-3-hydroxymethyl-4-hydroxyaniline, M.P. 157°. Mol. wt. (by mass spectral analysis) 166, calcd. 166. Its ultraviolet absorption spectrum exhibited a maximum at 3300 A. (H=5,700). Calculated for $C_8H_{10}N_2O_2$: C, 57.8; H, 6.1; N, 16.9. Found: C, 57.8; H, 6.1; N, 16.7.

*Example II*

A solution of 3-hydroxy-4-chlorobutyronitrile (13 g.; 0.108 mole) in benzene (100 ml.) was placed in a 3-necked 1-liter flask equipped with a mechanical stirrer, a condenser with a drying tube, and an addition funnel with a nitrogen pure. After the atmosphere in the flask had been replaced with nitrogen, a solution of sodium methoxide (from 2.3 g. of sodium; 0.1 mole) in methanol (40 ml.) and benzene (20 ml.) was added during 4 hours, to the rapidly stirred solution of the nitrile. During the addition a colorless precipitate gradually appeared and the solution assumed a deep orange color. Stirring was continued overnight and the insoluble white precipitate then removed by filtration and discarded. The filtrate was evaporated under reduced pressure to remove solvent and the gummy yellow residue triturated with ethanol. The solid material (1 g.) thus obtained was recrystallized twice from ethanol and furnished lemon-yellow crystals (0.8 g.) of the desired substance, M.P. 157°. A mixed melting point (156–157°) of this substance with a sample prepared in accordance with the procedure of Example I, showed no depression. Their infrared spectra were also identical.

The trans-3-4-dihydro-2-cyano-3-hydroxymethyl-4-hydroxyaniline is a highly reactive polyfunctional material which may be used to prepare many other compounds. In particular it is contemplated that it is useful as an intermediate in the synthesis of steroids. It is also useful as a dye. It is readily diazotized and coupled with sodium nitrite and phenol to a red dye.

Although my invention has been illustrated by specific examples, it is to be understood that it includes all modifications and variations that come within the scope of the appended claims.

What is claimed is:
1. Trans-3,4-dihydro-2-cyano-3-hydroxymethyl-4-hydroxyaniline.

2. The process for preparing trans-3,4-dihydro-2-cyano-3-hydroxymethyl-4-hydroxyaniline comprising, reacting an aqueous solution containing CN⁻ and having a pH between 11 and 13, with epichlorohydrin at a temperature between −50° C. and 5° C. thereby forming trans-3,4-dihydro-2-cyano-3-hydroxymethyl-4-hydroxyaniline, and then recovering said hydroxyaniline.

3. The process of claim 2 wherein the cyanide solution has a pH between 11.5 and 12.5, and the reaction temperature is maintained between −10° C. and 30° C.

4. The process of claim 3 wherein the reaction temperature is maintained between 0° C. and 5° C.

5. The process of claim 3 wherein said hydroxyaniline is recovered from the aqueous reaction mixture by extraction with ethyl acetate.

6. The process of claim 3 wherein the aqueous solution contains a dissolved alkaline cyanide compound.

7. The process for preparing trans-3,4-dihydro-2-cyano-3-hydroxymethyl4-hydroxyaniline comprising reacting MOR wherein M is selected from the group consisting of sodium, potassium, and lithium, and R is a lower alkyl with a 3-hydroxy-4-chlorobutyronitrile at a temperature between −50° C. and 50° C. thereby forming trans-3,4-dihydro-2-cyano-3-hydroxymethyl-4-hydroxyaniline, and recovering said hydroxyaniline.

8. The process of claim 7 wherein the reaction temperature is maintained between 0° C. and 20° C.

9. The process of claim 8 wherein the alkoxide is dissolved in an alcohol.

10. The process of claim 9 wherein said butyronitrile is dissolved in benzene.

11. The process of claim 9 wherein said alkoxide is sodium methoxide.

12. The process of claim 9 wherein said alkoxide is potassium methoxide.

13. The process of claim 9 wherein said alkoxide is lithium ethoxide.

References Cited

Rambaud et al.: C. A., 51, 1957, page 3602.

CHARLES B. PARKER, *Primary Examiner.*

J. P. BRUST, *Examiner.*

UNITED STATES PATENT OFFICE
CERTIFICATE OF CORRECTION

Patent No. 3,328,456　　　　　　　　　　　　　June 27, 1967

Francis Johnson

It is hereby certified that error appears in the above numbered patent requiring correction and that the said Letters Patent should read as corrected below.

Column 3, line 5, for "5° C." read -- 50° C. --.

Signed and sealed this 11th day of June 1968.

(SEAL)
Attest:

Edward M. Fletcher, Jr.　　　　　　　　　　　　EDWARD J. BRENNER
Attesting Officer　　　　　　　　　　　　　　　Commissioner of Patents